United States Patent [19]
Queen

[11] Patent Number: 5,589,818
[45] Date of Patent: Dec. 31, 1996

[54] PERSONAL RESPONSE SYSTEM WITH REMOTELY ADJUSTABLE MICROPHONE SENSITIVITY

[76] Inventor: Andrew Queen, 4744 S. Ocean Blvd., Highland Beach, Fla. 33487

[21] Appl. No.: 113,274

[22] Filed: Aug. 27, 1993

[51] Int. Cl.$^6$ .............................. G08B 29/00; G08B 1/00; G08B 23/00; H04M 11/04
[52] U.S. Cl. .......................... 340/506; 340/531; 340/573; 379/38; 379/45; 379/49
[58] Field of Search ...................................... 340/506, 539, 340/572, 573, 566, 533, 531; 379/37, 38, 45, 49, 51, 52, 58, 40, 42, 41, 89

[56] References Cited

U.S. PATENT DOCUMENTS

| | | | |
|---|---|---|---|
| 4,918,717 | 4/1990 | Bissonnette et al. | 379/40 |
| 5,237,602 | 8/1993 | Lazik | 379/38 |
| 5,243,657 | 9/1993 | Cotton | 381/57 |
| 5,333,171 | 6/1994 | Wang et al. | 379/37 |
| 5,333,173 | 6/1994 | Seazholtz et al. | 379/45 |

FOREIGN PATENT DOCUMENTS

| | | | |
|---|---|---|---|
| 2606190 | 5/1988 | France | 379/38 |
| 2206017 | 12/1988 | United Kingdom | 379/38 |

OTHER PUBLICATIONS

Ericsson Review (#2, 1981, vol. 58). Pp. 96–100 Copyright LM Ericsson.

*Primary Examiner*—Victor R. Kostak
*Assistant Examiner*—John W. Miller
*Attorney, Agent, or Firm*—John C. Smith

[57] ABSTRACT

A personal response system which provides speakerphone mode and emergency audio mode by controlling microphone sensitivity when audio signals fall below an acceptable level. Adjustable microphone sensitivity which can be controlled by the response center and/or by the help console itself. Emergency audio mode allows low level voices from outside the room the help console is in to be heard by allowing the response center to control the gradual raising or lowering the microphone sensitivity to vary the listening range of the microphone. A simultaneous increase in speaker volume allows response center personnel to converse with a disabled individual who cannot come to the help console. A second microphone and speaker in the personal transmitter permits two-way voice communication even when the individual is disabled outside of the dwelling and the help console is no longer effective.

16 Claims, 6 Drawing Sheets

PERSONAL RESPONSE SYSTEM WITH REMOTELY ADJUSTABLE MICROPHONE SENSITIVITY

CROSS-REFERENCE TO RELATED APPLICATIONS

This application is related to the commonly owned copending applications entitled "Programmable Personal Response System", filed Aug. 27, 1993, bearing U.S. Ser. No. 08/113,423, and "Self Testing Personal Response System", filed Aug. 27, 1993, bearing U.S. Ser. No. 08/113,614, and naming Andrew Queen, the named inventor herein, as sole inventor, the contents of which is specifically incorporated by reference herein in its entirety.

BACKGROUND OF THE INVENTION

1. Technical Field

The present invention relates to personal response systems. In particular, it relates to personal response systems providing audio communication between a user and a response center.

2. Background Art

Personal response systems (PRS) have been used for a variety of applications. A basic PRS consists of a response center, help consoles, and optional personal transmitters. Typically, the response center is a hub facility with communication lines available to communicate with one or more help consoles. The help consoles are placed at locations where the user can activate the help console in an emergency. Personnel at the response center can take appropriate action when the help signal is activated by the help console. A personal transmitter can be carried by the user to trigger the help console alarm in the event the user is unable to physically reach the help console.

A PRS can be put to use in a variety of situations. For example, a variety of industrial operations can employ a PRS to alert centrally located safety personnel of potential problems in various locations of a plant facility. A PRS can utilize sensor devices to automatically trigger fire alarms and notify the appropriate response center.

In addition to the foregoing, PRS's have found extensive use as support systems for older and/or disabled individuals. A serious concern among many such individuals is the possibility that they may be injured or otherwise need help and be unable to contact anyone. By having a help console at their home, an individual can contact a response center by pressing a button or equivalent on the help console. This provides quick assistance which may be vital to the individual depending on the nature of the emergency. In addition, it also provides a measure of reassurance and peace of mind to these individuals because they know they can obtain help in an emergency by activating the help console.

In addition to the button located on the help console, a PRS may also have a personal transmitter which can be carried on the individual's person. This typically is a small battery operated transmitter which enables the individual to activate the help console remotely. This is of advantage when the individual is immobilized and cannot reach the help console.

The three basic components of the PRS are the response center, the help console, and the personal transmitter. When a response center receives a request for help from a help console, personnel at the response center contact the party requesting help or take other action as required. The help console typically uses telephone lines for economic efficiency. However, a variety of technologies may be implemented to accomplish communication between the help console and the response station, such as cellular telephone transmission, radio, microwave links, etc. In addition, multiple redundant links may be used to protect against a failure in the communication lines. Likewise, the personal transmitter may use a variety of technologies to communicate with the help console such as infrared, ultrasonic, radio, etc.

The request for help may be activated from the help console or the personal transmitter. In addition, the response center may periodically query some or all of the help consoles to ensure that the help console is operational. In the event the response center could not reach the help console, the appropriate notice would be issued to response center personnel.

In addition to the communication of a help request, as discussed above, some systems have help console speakerphone arrangements. The integration of a speakerphone into the help console allows the personnel at the response center to speak directly to the individual at the help console. In turn, the exact nature of the problem can be determined quickly and in more detail. Unfortunately, help console speakerphones tend to operate best over a short distance, typically no farther than the room the help console is in. In the event an individual is in another room or other part of a dwelling, the help console speakerphone loses it's effectiveness. This is a serious disadvantage when the individual is incapacitated and cannot come to the help console to speak. Of course, the help console speakerphone is of no use at all when the individual is outside of the dwelling and unable to reenter. In this case, the individual may be able to turn on the help console with the personal transmitter, but response center personnel would be unable to determine what the problem is without dispatching someone to the individual's residence.

While existing PRS systems have provided significant benefit to individuals, they have not addressed the problem of using the help console speakerphone when an individual is in another part of a dwelling and unable to get close enough to the speakerphone for two way communication to take place. Likewise, the prior art has failed to provide two voice communication when the individual is incapacitated outside of a dwelling.

SUMMARY OF THE INVENTION

The present invention solves the foregoing problems by providing adjustable help console microphone sensitivity which can be controlled by the response center and/or by the help console itself. Increasing the microphone sensitivity allows low level voices to be heard several rooms away. Additionally, an increase in speaker volume allows response center personnel to converse with a disabled individual who cannot come to the help console. A second microphone and speaker in the personal transmitter permits two-way voice communication even when the individual is disabled outside of the dwelling and the help console speakerphone is no longer effective.

DESCRIPTION OF THE PREFERRED EMBODIMENT

Figure 1:
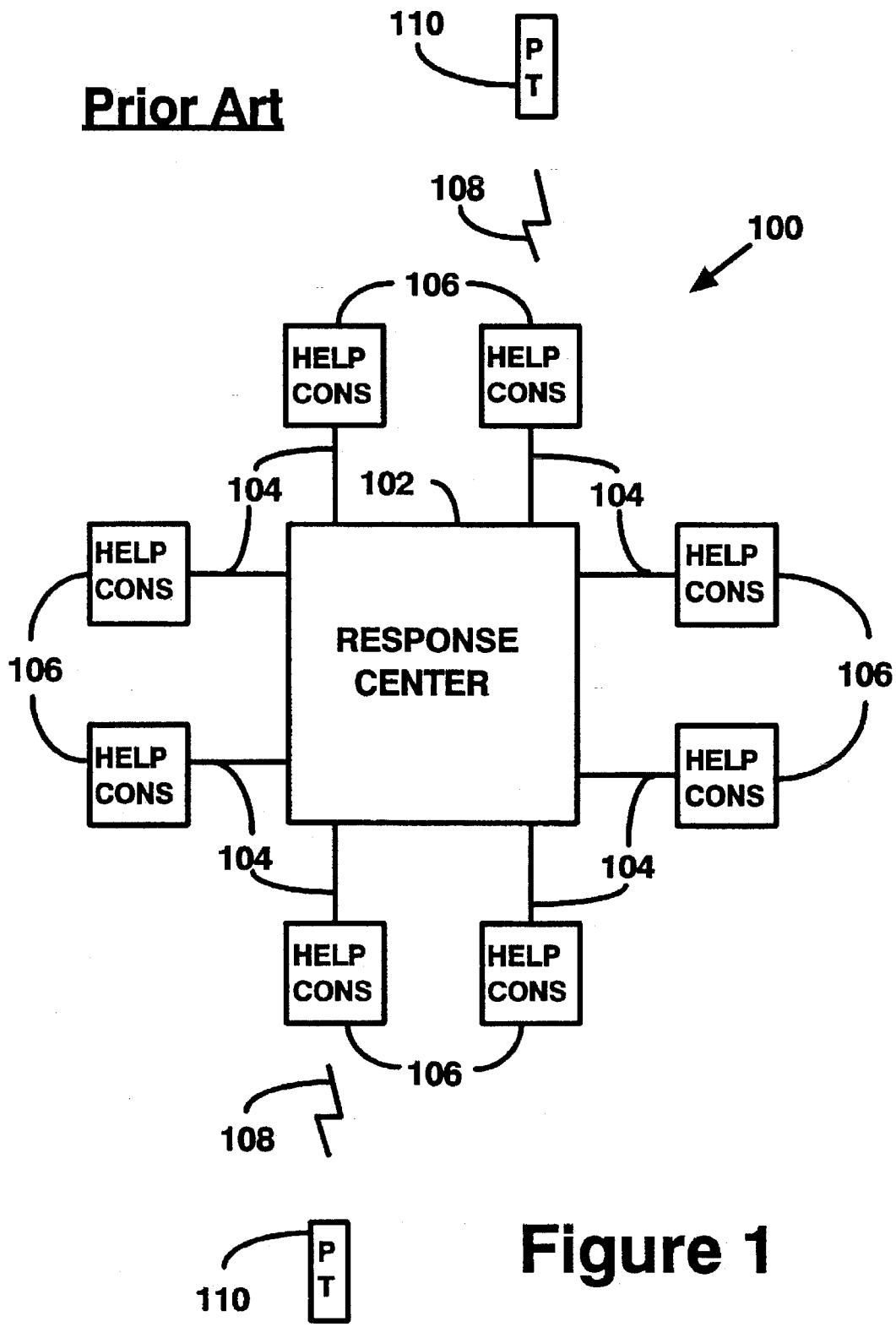
FIG. 1 is a diagram of a prior art PRS system.

FIG. 1 is illustrative of a typical prior art PRS system 100. A response center 102 has numerous communications lines 104 which allow help consoles 106 at remote locations to alert the response center to an emergency condition. Response centers are well known in the art and typically include numerous items of telephone and computer equipment. In addition to the help console, a personal transmitter 110 may be used to allow activation of the help console 106 from the remote location. Jagged line 108 represents a radio, infrared, or other suitable communication signal from personal transmitter 108 which triggers an emergency request by help console 106 over communication line 104. Numerous communication technologies, such a telephone, cellular, personal communication devices, radio, microwave, etc., can perform this function. However, telephone communication is usually chosen as the most practical method.

Figure 2:
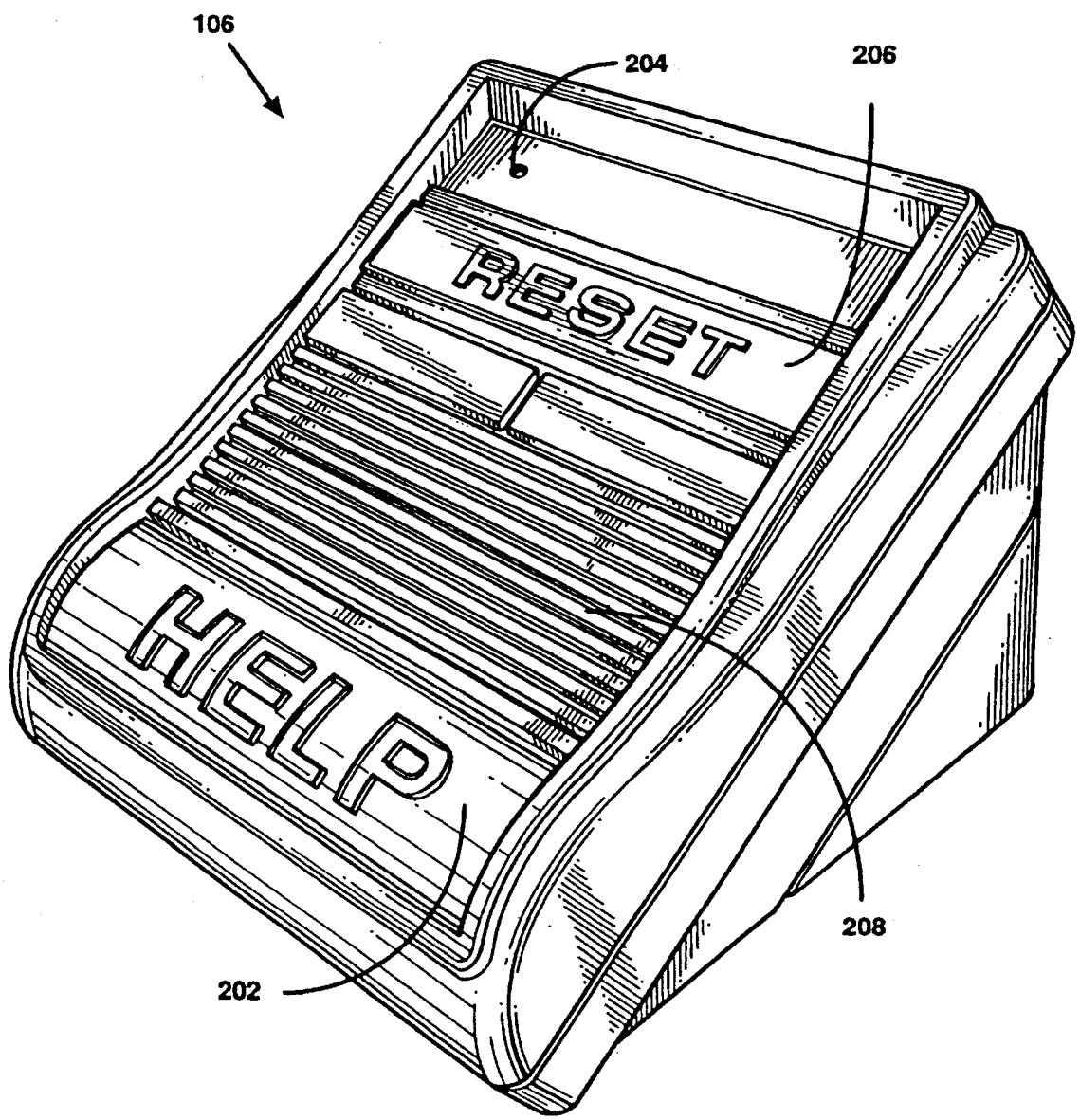
FIG. 2 is a diagram of the help console used in the preferred embodiment.

FIG. 2 shows the help console 106 used in the preferred embodiment. Help bar 202 activates a signal to the response center 102 indicating an emergency. Reset button 206 allows the emergency signal to be turned off by the individual user. Grill 208 conceals help the console speaker (not shown) which is included in the speakerphone function of the help console. Microphone 204 is located on the front panel. Speakerphones are well known in the art.

Figure 3:
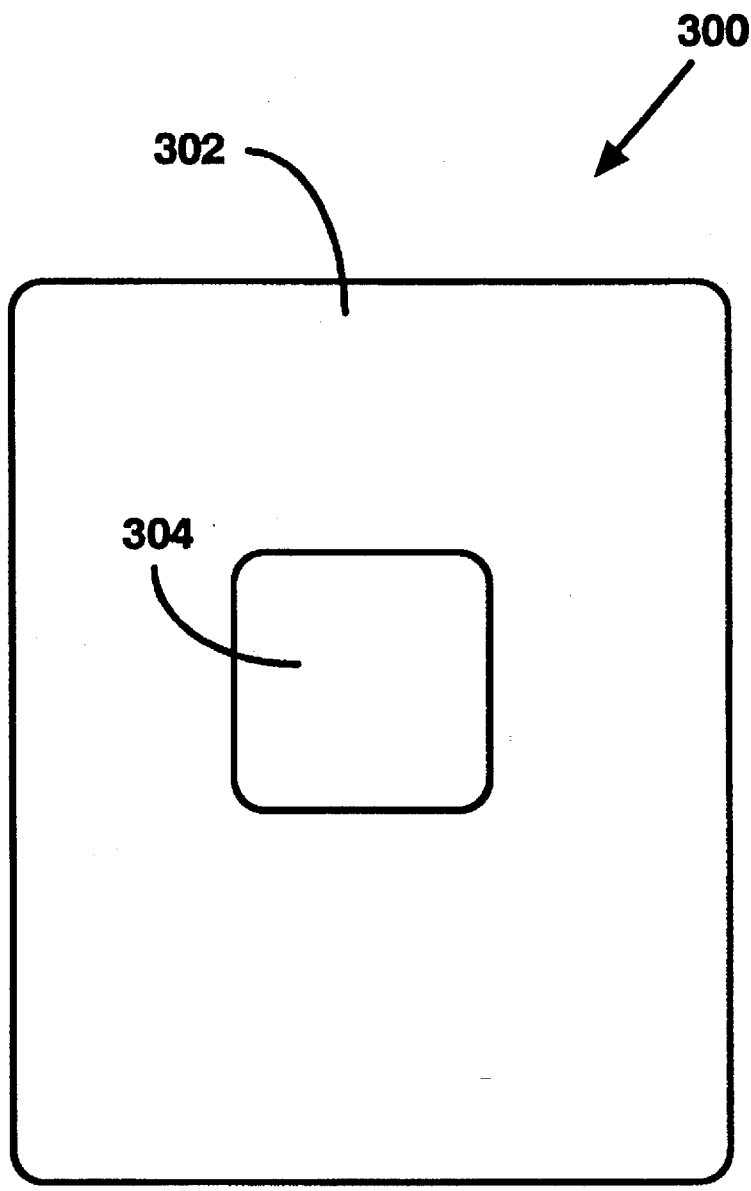
FIG. 3 is a diagram of one embodiment of the personal transmitter.

FIG. 3 shows the personal transmitter 300 used both in the prior art and in one embodiment of the instant invention. It includes an outer shell 302 and a help button 304. It contains a battery powered transmitter (not shown) which transmits a signal to the help console 106 when help button 304 is pressed. The signal from personal transmitter 300 activates help console 106 which then sends an emergency signal to the response center 102. This type of transmitter is well known in the art.

Figure 4:
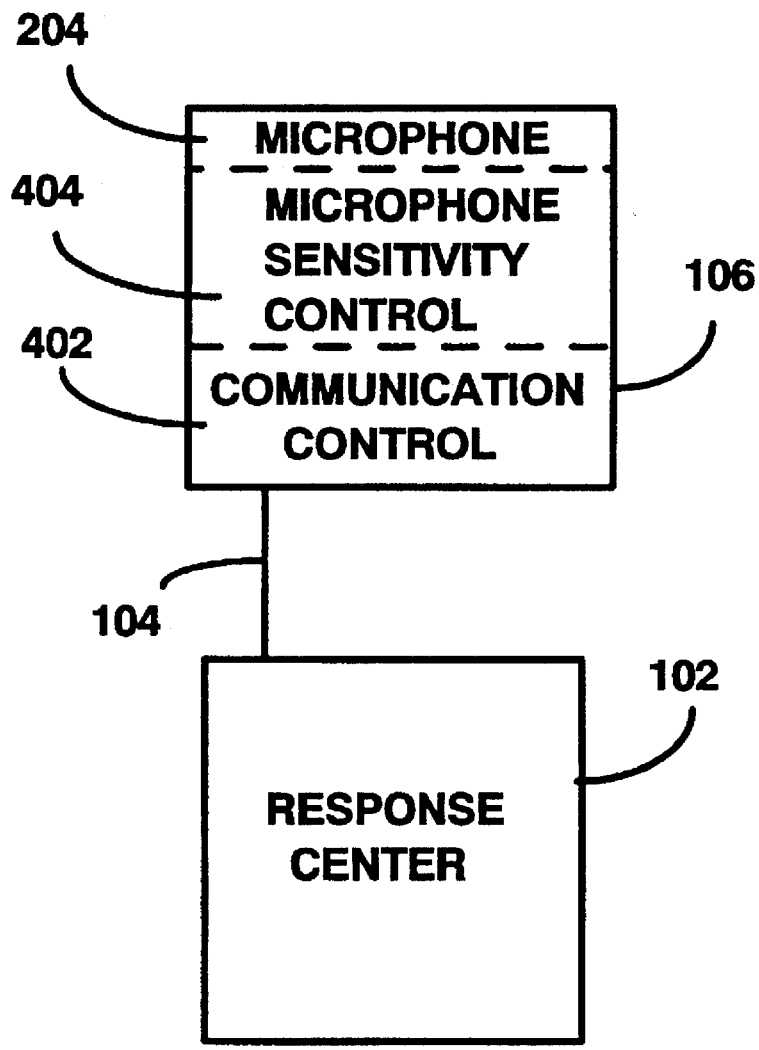
FIG. 4 is a diagram of the microphone sensitivity control system used in one embodiment of the present invention.

FIG. 4 shows a diagram of the microphone sensitivity control system used in one embodiment of the present invention. When an emergency signal is sent to the response center 102 by help console 106, response center 102 personnel attempt to establish audio communication with the individual at help console 106. If the individual is mobile, normal speakerphone mode is established. The individual is in close proximity to the help console and two-way audio communication is established.

If the individual is injured, or otherwise unable to approach the help console 106, then voice communication will be impaired due to the distance of the individual from the microphone 204 in the help console 106. The individual may even be in another room, out of range of microphone 204. Likewise, the nature of the individual's incapacity may be such that the individual can only speak in a low level.

In the preferred embodiment, personnel at the response center, upon receiving weak audio or even no audio response can issue a command to the help console 106 via communication control 402 to command help console 106 to enter emergency audio mode. In emergency audio mode, microphone sensitivity control 404 to alters the sensitivity of microphone 204. The communication control 402 requires only the circuitry necessary to recognize a microphone sensitivity command and pass it to microphone sensitivity control 404. Those skilled in the art will recognize that communication control 402 and microphone sensitivity control 404 can be implemented in hardware, software or a combination of hardware or software.

In the preferred embodiment, sensitivity is increased under control of the response center 102 from a low level to a high level. It has been found that by greatly increasing normal sensitivity, low voices can be heard throughout most dwellings. Those skilled in the art will recognize that sensitivity increases are a design choice related to the characteristics of the particular microphone selected and are a matter of design choice. However, in an alternate embodiment, sensitivity can be increased gradually by the response center 102 depending on the quality of the received audio. The quality of the received audio will vary based on the distance from the individual to the help console 106 as well as the loudness of the individual's voice. As a result of providing a control mechanism for microphone sensitivity, response center personnel can obtain information from the user of the help console 106 which was heretofore unavailable. By providing this information, proper response can be provided in a more timely fashion and with more information.

In the preferred embodiment, the volume of the speaker (not shown) in help console 106 is increased as microphone 204 sensitivity is increased. In this fashion, an individual in another room of the dwelling not only can be heard by the response center 102, but can also hear the personnel at the response center 102. Of course, those skilled in the art will recognize that the speaker and microphone functions of help console 106 are independent and the microphone 204 sensitivity can just as easily be controlled without altering speaker volume. Likewise, microphone 204 is inactive while the speaker is activated to avoid feedback.

In an alternative embodiment, microphone sensitivity control 404 can operate automatically and independent of response center 102. In this mode, help console 102 monitors received voice levels output from microphone 204 and adjusts sensitivity to a predetermined range, typically in the range found when an individual is speaking in the same room as the help console 106. Those skilled in the art will recognize that the range values will vary based on the type of components selected for the help console 106 and the response center 102.

Control of microphone 204 sensitivity, whether it be local to help console 106 or directed remotely from the response center 102, solves one problem associated with prior art systems by improving two-way voice communication when the individual in the dwelling cannot come to the help console 106. However, there remains a second problem associated with individuals who are immobilized outside of the dwelling or somewhere in the dwelling where acoustics would prevent audio reception (for example, near noisy appliances or locked in a bathroom).

Figure 5:
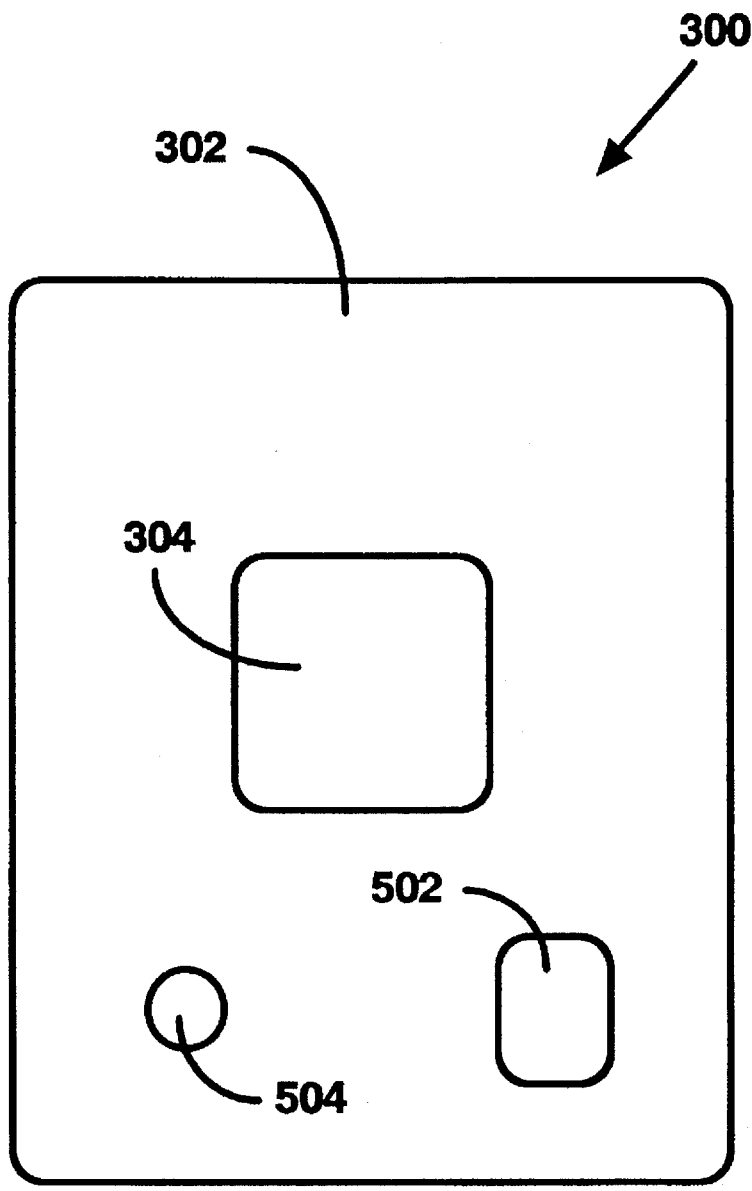
FIG. 5 is a diagram of an alternative embodiment of the personal transmitter.

FIG. 5 shows an alternative embodiment of personal transmitter 300 which addresses this problem. In this embodiment, personal transmitter 300 includes a personal microphone 504 and a personal speaker 502. Personal transmitter 300 also contains a small two-way transmitter/receiver to allow voice transmission between personal transmitter 300 and help console 106. Voice signals are relayed from help console 106 to response center 102. In this manner, even if an individual was disabled outside of the dwelling, voice communications with the response center 102 could be maintained with the resulting improvement in obtaining the proper type of emergency service on a more timely basis. Those skilled in the art will recognize that many modifications can be made to the personal transmitter 300. It can be hardened for everyday use through the selection of water-resistant or waterproof microphones and speakers. Switches for volume control of the personal transmitter speaker 502 can be installed, etc.

Figure 6:
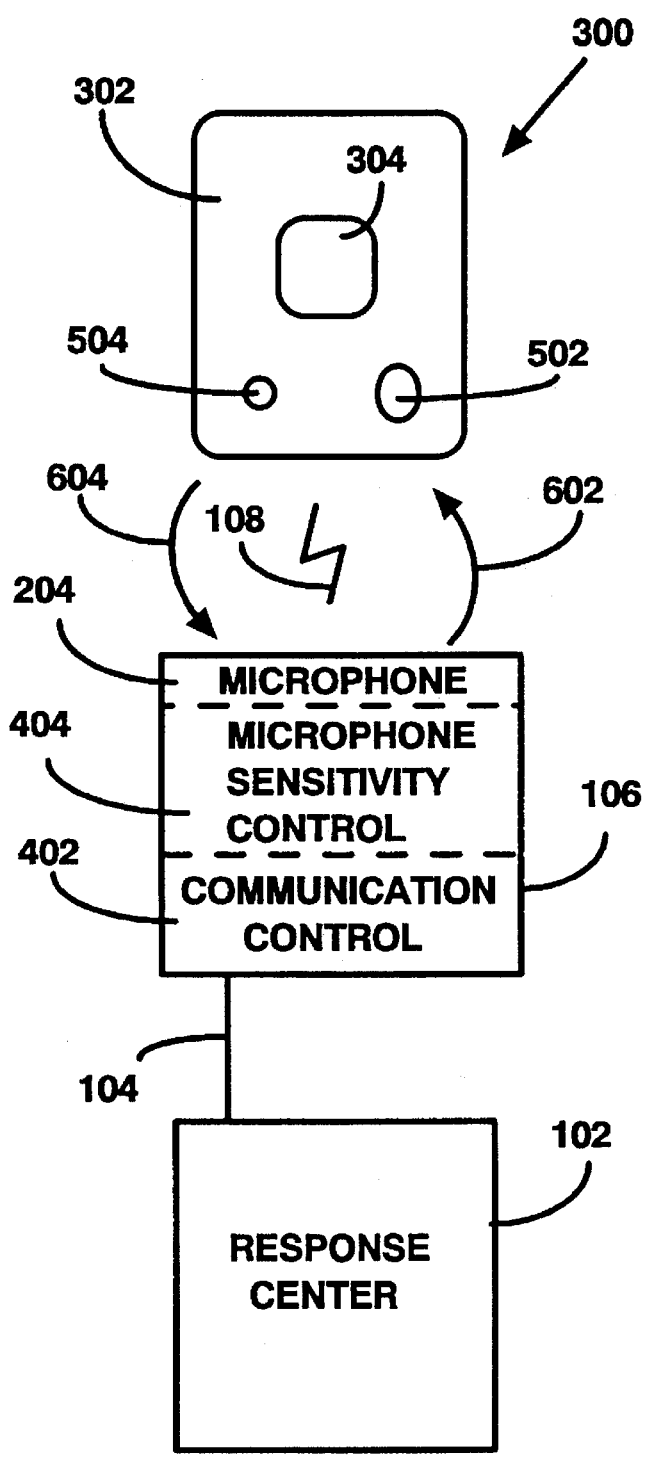
FIG. 6 is a diagram of the personal response system with voice communication between the help console and the personal transmitter.

FIG. 6 shows a fully configured system in which voice communication is improved by controlling the sensitivity of microphone 404 sensitivity as well as extending voice communication to the personal transmitter 300. In this configuration, response center 102 personnel can communicate with an individual in a variety of locations which was heretofore impossible.

As can be seen, help console 106 operates as discussed above in relation to FIG. 4. Likewise, help button 304 generates a signal 108 triggering help console 106 to notify response center 102. In addition, audio input 604 from personal transmitter 300 and audio output to personal transmitter 300 are now available. Those skilled in the art will recognize that while a fully configured system, having both sensitivity control at the help console 106 and audio communications to the personal transmitter 300, provides the most complete protection for an individual user, each feature can be implemented separately. In addition, sensitivity control can easily be extended to personal transmitter microphone 504.

While the invention has been described with respect to a preferred embodiment thereof, it will be understood by those skilled in the art that various changes in detail my be made therein without departing from the spirit, scope, and teaching of the invention. For example, several other transmission technologies can be substituted for the telephone links in the preferred embodiment. Likewise, combinations of the features disclosed can be implemented to provide specific solutions to a given situation. Accordingly, the invention herein disclosed is to be limited only as specified in the following claims.

I claim:

1. A personal response system with emergency audio mode, comprising:
    a response center for monitoring a plurality of help consoles for emergency status conditions, the response center further having means to transmit microphone sensitivity commands; at least one help console for use in a user's premises, further comprising:
        a microphone sensitivity control;
        a communications control to communicate with the response center, the communications control capable of receiving microphone sensitivity commands from the response center which define gradual changes in microphone sensitivity and further having means to control the microphone sensitivity control;
        the microphone sensitivity control is controlled by the communications control and has an output for adjusting microphone sensitivity levels;
        a microphone means to input and transmit audio signals from the help console to the response center, the sensitivity of the microphone means controlled by the microphone sensitivity control such that a single microphone in the microphone means can have its sensitivity adjusted to extend from the immediate area of the microphone to several rooms within the user's premises; and
        a speaker to output audio signals received from the response center;
    whereby the response center can gradually adjust the microphone sensitivity of the help console such that the physical listening range of a single microphone in the help console can be gradually increased from the immediate area of the help console to several rooms within the user's premises.

2. A personal response system with emergency audio mode, comprising: a response center for monitoring a plurality of help consoles for emergency status conditions, the response center further having means to transmit microphone sensitivity commands;
    at least one help console for use in a user's premises, further comprising:
        a microphone sensitivity control;
        a communications control to communicate with the response center, the communications control capable of receiving microphone sensitivity commands from the response center which define gradual changes in microphone sensitivity and further having means to control the microphone sensitivity control;
        the microphone sensitivity control is controlled by the communications control and has an output for adjusting microphone sensitivity levels;
        a microphone means to input and transmit audio signals from the help console to the response center, the sensitivity of the microphone means controlled by the microphone sensitivity control; and
        a speaker to output audio signals received from the response center; and
        a volume adjusting means for adjusting the volume of the speaker under control of the microphone sensitivity commands to enable output of stronger audio signals;
    whereby the response center can gradually adjust the microphone sensitivity of the help console such that the physical listening range of the help console can be gradually increased.

3. A system, as in claim 2, further comprising:
    a portable personal transmitter, further comprising:
        means to remotely initiate communication from the help console to the response center either inside or outside of the user's premises; and
        a personal transmitter microphone to input audio signals to the help console; and
    means in the help console to receive audio signals from the portable personal transmitter and transmit the received audio signals to the response center.

4. A system, as in claim 3, wherein the portable personal transmitter further comprises a personal transmitter speaker to output audio signals from the portable personal transmitter.

5. A system, as in claim 2, further comprising:
    a portable personal transmitter, further comprising:
        means to receive audio signals transmitted from the help console; and
        a personal transmitter speaker to output audio signals received from the help console; and
    means in the help console to receive audio signals from the response center and transmit the received audio signals to the portable personal transmitter.

6. A personal response system with emergency audio mode, comprising:

a response center for monitoring a plurality of help consoles for emergency status conditions, the response center further having means to transmit microphone sensitivity commands;

at least one help console for use in a user's premises, further comprising:

a microphone sensitivity control;

a communications control to communicate with the response center, the communications control capable of receiving microphone sensitivity commands from the response center which define gradual changes in microphone sensitivity and further having means to control the microphone sensitivity control;

the microphone sensitivity control is controlled by the communications control and has an output for adjusting microphone sensitivity levels;

a microphone means to input and transmit audio signals from the help console to the response center, the sensitivity of the microphone controlled by the microphone sensitivity control; and a speaker to output audio signals received from the response center, the speaker's volume is controlled by the microphone sensitivity control such that as the microphone sensitivity increases, the speaker's volume increases; and whereby the response center can simultaneously control the sensitivity of the microphone and the speaker volume such that the physical area around the help console can be gradually extended by the response center.

7. A system, as in claim 6, further comprising:

a portable personal transmitter, further comprising:
means to remotely initiate communication from the help console to the response center either inside or outside of the user's premises; and
a personal transmitter microphone to input audio signals to the help console; and means in the help console to receive audio signals from the portable personal transmitter and transmit the received audio signals to the response center.

8. A system, as in claim 7, wherein the portable personal transmitter further comprises a personal transmitter speaker to output audio signals from the portable personal transmitter.

9. A system, as in claim 6, further comprising:

a portable personal transmitter, further comprising:
means to receive audio signals transmitted from the help console either inside or outside of the user's premises; and
a personal transmitter speaker to output audio signals received from the help console; and means in the help console to receive audio signals from the response center and transmit the received audio signals to the portable personal transmitter.

10. A personal response system with emergency audio mode, comprising:

a response center for monitoring a plurality of help consoles for emergency status conditions, the response center further having means to transmit microphone sensitivity commands;

at least one help console for use in a user's premises, further comprising:

a microphone sensitivity control;

a communications control to communicate with the response center, the communications control capable of receiving microphone sensitivity commands from the response center which define gradual changes in personal transmitter microphone sensitivity and further having means to control the personal transmitter microphone sensitivity control;

the personal transmitter microphone sensitivity control is controlled by the communications control and has an output for adjusting personal transmitter microphone sensitivity levels such that a single microphone in the personal transmitter microphone can have its sensitivity adjusted to extend from the immediate area of the personal transmitter microphone to several rooms within the user's premises;

means to communicate with the portable personal transmitter, a portable personal transmitter, further comprising:
means to remotely initiate communication from the help console to the response center; and
a personal transmitter microphone to input audio signals to the help console, the sensitivity of the microphone controlled by the microphone sensitivity control; and means in the help console to receive audio signals from the portable personal transmitter and transmit the received audio signals to the response center;

whereby the response center can gradually adjust the personal transmitter microphone sensitivity of the portable personal transmitter from the immediate area of the help console to several rooms within the user's premises.

11. A personal response system with emergency audio mode, comprising:

a response center for monitoring a plurality of help consoles for emergency status conditions, the response center further having means to transmit microphone sensitivity commands;

at least one help console for use in a user's premises, further comprising:

a help console microphone means to input and transmit audio signals from the help console to the response center;

a microphone sensitivity control;

a communications control to communicate with the response center, the communications control capable of receiving microphone sensitivity commands from the response center which define gradual changes in personal transmitter microphone sensitivity and further having means to control the personal transmitter microphone sensitivity control;

the personal transmitter microphone sensitivity control is controlled by the communications control and has an output for adjusting personal transmitter microphone sensitivity levels;

a portable personal transmitter, further comprising:
means to remotely initiate communication from the help console to the response center; and
a personal transmitter microphone to input audio signals to the help console, the sensitivity of the microphone controlled by the microphone sensitivity control; and means in the help console to receive audio signals from the portable personal transmitter and transmit the received audio signals to the response center;

whereby the response center can gradually adjust the microphone sensitivity of the portable personal transmitter.

12. A personal response system help console with emergency audio mode, comprising:

a help console;

means to communicate with a response center;

means to initiate communications with the response center by the help console;

a microphone means to input and transmit audio signals from the help console to the response center;

a speaker to output audio signals received from the response center; and means to automatically select a sensitivity level for the microphone means to enable input of weaker audio signals from locations remote from the microphone means; and means to receive microphone sensitivity commands from the response center to override the sensitivity level of the microphone selected by the help console;

whereby audio input from an extended physical area at the help console can be monitored by controlling the microphone sensitivity of the help console microphone.

13. A system, as in claim 12, further comprising:

means to receive microphone sensitivity commands from the response center; and a volume adjusting means for adjusting the volume of the help console speaker under control of the response center microphone sensitivity commands;

whereby the speaker volume is gradually increased as microphone sensitivity is gradually increased.

14. A system, as in claim 13, further comprising:

a personal transmitter, further comprising:

means to remotely initiate communication from the help console to the response center; and a personal transmitter microphone to input audio signals to the help console either inside or outside of the user's premises, the sensitivity of the personal transmitter microphone controlled by the microphone sensitivity control; and means in the help console to receive audio signals from the personal transmitter and transmit the received audio signals to the response center.

15. A system, as in claim 14, wherein the personal transmitter further comprises a personal transmitter speaker to output audio signals from the personal transmitter, the microphone sensitivity control simultaneously controls the sensitivity of the microphone and the speaker volume such that the effective range of the personal transmitter can be gradually varied under control of the response center.

16. A system, as in claim 13, further comprising:

a personal transmitter, further comprising:

means to receive audio signals transmitted from the help console; and a personal transmitter speaker to output audio signals received from the help console; and means in the help console to receive audio signals from the response center and transmit the received audio signals to the personal transmitter.

* * * * *